July 26, 1966      A. SHULTZ      3,263,010
NON-CELLULAR UNITARY STRUCTURES AND PREPARATION THEREOF
Filed Oct. 31, 1962
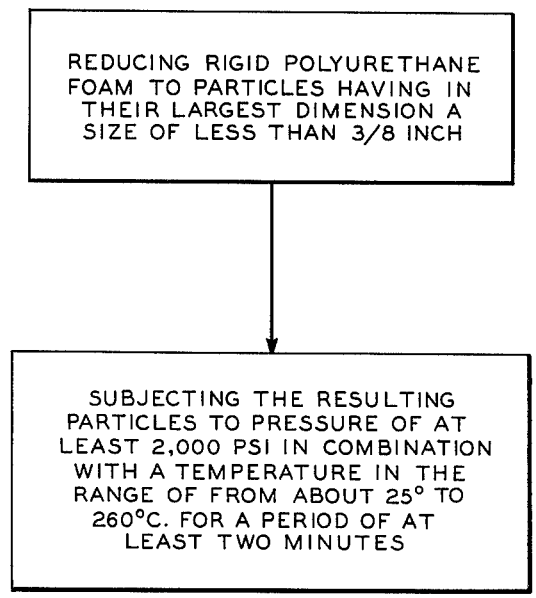
INVENTOR
ANDREW SHULTZ
BY
*Frederick N. Weinfeldt*
ATTORNEY United States Patent Office 3,263,010
Patented July 26, 1966

3,263,010
NON-CELLULAR UNITARY STRUCTURES AND PREPARATION THEREOF
Andrew Shultz, Amherst, N.Y., assignor to Allied Chemical Corporation, New York, N.Y., a corporation of New York
Filed Oct. 31, 1962, Ser. No. 234,510
3 Claims. (Cl. 264—126)

This invention relates to the production of strong non-cellular unitary structures from rigid polyurethane foam.

Reaction of polyisocyanates with organic compounds having a plurality of groups containing active hydrogen atoms selected from a wide variety of polyfunctional compounds such as polyamides, polyalcohols, aminoalcohols, polyhydroxy esters, polyamides, polythiols, polysulfonamides or mixtures thereof is well known in the art and is of substantial commercial importance. The term "active hydrogen atoms" refers to hydrogens which display activity according to the Zerewitinoff test as described by Kohler in J. Am. Chem. Soc., 49, 3181 (1927). The reaction products depending upon the extent of cross-linking, which is induced in the polymer by choice of active hydrogen-containing reactant, inclusion of cross-linking agent, or both, are classified as being either rigid (highly cross-linked) or flexible (little cross-linking) polymers. The reaction products can be obtained as cellular products or "foams" by including in the polymerizing mixture one or a combination of blowing agents, such as carbon dioxide formed in situ by reaction of water with the isocyanate radicals, low boiling fluorohydrocarbons and the like. The structures of the present invention are prepared from rigid polyurethane foams.

Rigid polyurethane foams have found wide spread use as insulating materials. In some instances, the foam, produced in the form of sheets cut and trimmed to desired size and shape, is applied to the surface to be insulated. Production of the sheets and their cutting and trimming produce waste which heretofore has found no entirely satisfactory use. This waste has constituted a significant part of the cost of the insulating material.

Accordingly, it is an object of the present invention to provide new non-cellular unitary structures. Another object is to provide a process for the production of such unitary structures from rigid polyurethane foam. Still another object is to provide a process for utilizing waste polyurethane rigid foam by economical conversion thereof into useful unitary structures. Other objects will be apparent from the following description.

In accordance with the present invention, non-cellular unitary structures are produced by reducing rigid polyurethane foam to particulate form, preferably to minute particulate form, and further subjecting the resulting particles to a pressure of at least about 2000 p.s.i. in combination with a temperature in the range from about 25° to 260° C. for a period of at least about two minutes.

The unitary structures of the present invention are rigid, non-cellular materials which possess excellent dimensional stability and high rigidity strength and may be employed as substitutes for wall boards, tiles, wooden panels and the like. Structures of the present invention produced according to preferred aspects of this invention possess desirable characteristics of wood but eliminate the basic disadvantage of wood, namely, deterioration and decomposition when subjected to prolonged atmospheric exposure.

Although it may not be stated with any degree of certitude, it appears that the process of the present invention effects a chemical rather than a physical conversion between adjacent particles resulting into development of a highly cross-linked, physically strong structure. In conventional procedures for the production of rigid polyurethane foam, it is an accepted practice to use an excess of one of the reactants over the stoichiometric requirement to react with the other and often to employ an excess of isocyanate reactant. It is believed that as the reaction proceeds and the isocyanate groups become less mobile, the opportunities for these groups to react with active hydrogen containing groups substantially decrease. Thus, it is postulated that the employment of pressure of at least 2000 p.s.i. in combination with a reaction temperature of about 25° to 260° C. over a period of at least two minutes promotes further reaction of the isocyanate groups with the active hydrogen containing groups to produce the desired unitary structure. More specifically, under the above recited conditions, the latent potentiality of further reaction of free isocyanate groups with active hydrogen-containing groups which may be present such as free hydroxyl groups, amino groups, urea groups and/or amido groups is readily activated. Further allophanate groups present may decompose, especially in the presence of catalytic amounts of amines, and the urea and/or urethane groups formed thereby proceed to react with the active hydrogen-containing groups present. These probable reactions substantially add to the extent of cross-linking present within and between the particles of the polymer mass and thus contribute to the excellent dimensional stability and high rigidity of the structure produced thereby.

It has been discovered also that if particulate material subjected to the reaction under compression is composed partly of foam produced when an excess of isocyanate is present and partly of foam produced when excess reactive hydrogen is present, for example, in the form of hydroxyl groups, the qualities of the molded product produced are enhanced.

As previously recited, the temperature employed may vary over the range from about 25° to 260° C. It has been found that temperatures below 25° C. produce unitary structures of minimum rigidity and are generally rejected as unsatisfactory. On the other hand, temperatures in excess of 260° C. promote significant decomposition of the polyurethane foam and present an additional impediment in conventional molding or extrusion procedures due to undesirable adhesion of molten polyurethane foam to the walls of the apparatus employed. In preferred operation, temperatures from about 120° to 190° C. produce desired unitary structures possessing unusually excellent dimensional stability and high rigidity strength.

It is essential in the process of the present invention to employ high pressure in combination with a temperature in the range previously recited. Pressure below 2000 p.s.i. does not render a unitary structure of acceptable dimensional stability or rigidity. Materials secured under such pressurized conditions, even though processed at elevated temperatures, exhibited marked tendencies of shredding and cracking under minimum load. Accordingly, it is preferred to utilize in combination with temperatures between the range of 25° to 260° C. a pressure from about 2000 to 10,000 p.s.i. Particularly outstanding results are attained at pressure of about 2500 to 5000 p.s.i.

It is also essential in the process of the present invention that the rigid polyurethane foam be reduced to particulate form. It has been found that particles of comminuted foam having as their largest dimension a size of less than 3/8 inch must be used if excellent dimensional stability and high rigidity are to be secured. The more minute the particles the greater the degree of dimensional stability secured. In preferred operation, particles which are ⅛ inch or less in the largest dimension are utilized. Such reduction of the rigid polyurethane foam may be readily effected by conventional means such as grinding, grating or shredding.

The time required for preparation of the desired unitary structures may vary over a wide range. For example, the time employed may vary from two minutes at elevated temperatures and high pressures to several hours at lower pressures and temperatures. Another factor to be considered in determination of the length of time employed is the size of the particles employed since larger particles will necessitate extended reaction periods.

In preferred operation, rigid polyurethane foam is reduced to a particulate form by shredding, forming particles which are not more than ⅛ inch in the largest dimension. The resulting particles are then placed in a suitable vessel for compression, such as a mold, at a temperature from about 120° to 190° C. and subjected to a pressure of 2500 to about 5000 p.s.i. for a period of about 5 minutes to about 1 hour in a hydraulic press. The pressure is released and the resulting unitary structure is removed and allowed to cool.

If desired, pigments to impart color, bonding agents, for example, molasses or other resins (such as vinyl, phenolics, epoxides), fire retardants, fillers and the like may be admixed with the particulate mass prior to molding.

The following examples in conjunction with the accompanying drawing are given for the purpose of illustrating the present invention but are not intended to limit the scope thereof. In the examples, parts are by weight.

EXAMPLE 1

A polyurethane rigid foam was prepared as follows. A reaction mixture consisting of 160 parts of polyether triols having hydroxyl numbers in the range of 375 to 380, an acid number less than 1, and a water content less than 1 percent by weight, 1.5 parts of silicone emulsifier, 1.2 parts of dibutyl tin dilaurate, 15.0 parts of tetra(hydroxypropyl)ethylenediamine and 47.0 parts of trichloromonofluoromethane was prepared and cooled to temperature of 20° C. To the reaction mixture were added 137 parts of cold (15° C.) tolylene diisocyanate having an amine equivalent of 103.5.

The reaction mass was agitated for about 35 seconds and permitted to stand for about 16 hours. The resulting rigid foamed product was cut into one-inch slices by a band saw and masticated by a Quaker mill into pieces of a dimension similar to wood chips or sawdust. These were micropulverized to a powder having an average particle size of about 0.004 inch.

33 parts of the above cellular rigid polyurethane were charged in two portions to a 4 inch diameter closed mold and subjected in a hydraulic press to a compression of 2000 p.s.i. for about 20 seconds after each charge. Thereafter, the entire mass was subjected to 4000 p.s.i. for about 3 minutes at about 25° C. The pressure was then released and a non-cellular panel about 0.24 inch in thickness was removed from the mold and cooled. The resulting polyurethane panel possessed a density of about 40 pounds per cubic foot and a Rockwell hardness (R-scale) of 68. This panel while not exhibiting optimum strength and rigidity secured when empolying the preferred reaction conditions of the present invention, may be readily utilized as, for example, an outer layer of gypsum wallboard or as a substitute therefor.

EXAMPLE 2

30 parts of the cellular rigid polyurethane particles prepared in Example 1 were charged to a 4 inch diameter closed mold and compressed in a hydraulic press at 3200 p.s.i. and 150° C. for a period of 7 minutes. The pressure was then released an a non-cellular panel about 0.24 inch in thickness was removed and cooled. The resulting panel possessed good physical properties, as illustrated in Table I below.

EXAMPLE 3

The procedure of Example 2 was repeated using 27 parts of the rigid cellular polyurethane particles and 3 parts of polyvinyl chloride. The panel so produced had improved physical properties, as illustrated in Table I.

EXAMPLE 4

The procedure of Example 2 was repeated with the exception that the compression time was increased from 7 to 14 minutes. The resulting panel exhibited a 40 percent increase in density and 400 percent increase in flexural strength, as shown in Table I.

EXAMPLE 5

The procedure of Example 4 was repeated utilizing 27 parts of the cellular rigid polyurethane particles and 3 parts of polyvinyl chloride. The resulting panel exhibited outstanding physical properties, as illustrated in Table I.

*Table I.—Physical properties of non-cellular rigid polyurethane*

| Example | 2 | 3 | 4 | 5 |
|---|---|---|---|---|
| Density, lbs./ft.³ | 35 | 38 | 49.7 | 47.2 |
| Flexural Strength, p.s.i. | 933 | 1,354 | 4,117 | 3,476 |
| Flexural Modulus, p.s.i. | 56,750 | 66,880 | 217,850 | 172,350 |
| Rockwell Hardness (M-scale) | 75 | 94 | 95 | 95 |
| Dimensional Stability: | | | | |
| 24 hrs. Humid Aging at 70° C. | N.C. | N.C. | N.C. | N.C. |
| 24 hrs. Dry Heat Aging at 110° C. | N.C. | N.C. | N.C. | Sl. C. |
| 24 hrs. Humid Aging at 90° C. | N.C. | N.C. | N.D. | N.D. |
| Water Immersion: | | | | |
| 24 days at R.T. | N.C. | N.C. | N.C. | N.C. |
| 7 days at R.T. | N.C. | N.C. | N.C. | N.C. |

Legend:
N.C.—No change in dimension.
Sl. C.—Slight change (slight increase in height).
R.T.—Room temperature.
N.D.—Not determined.

EXAMPLE 6

Two rigid polyurethane foams were prepared and reduced to particulate form as described in Example 1, with the exception noted below.

In one case (Foam A), the formulation was adjusted to provide a 3 percent excess of isocyanate groups over the stoichiometric requirement for complete reaction with hydroxyl groups present in the formulation.

In the second case (Foam B), the formulation was adjusted to provide a 3 percent deficit of isocyanate groups over the stoichiometric requirement for complete reaction with the hydroxyl groups present in the formulation.

Panels were prepared by the procedure of Example 2 above using 3200 p.s.i., 150° C. and 20 minutes of compression. One panel (A) was prepared using 30 parts of particles prepared from Foam A. The other panel (A/B) was prepared using 30 parts of a 50/50 mixture of particles prepared from Foam A and Foam B.

The physical properties of the resultant panels were determined to be:

*Table II*

| Property | Panel A | Panel A/B |
|---|---|---|
| Density, lb./ft.³ | 53.3 | 57.3 |
| Flexural Strength | 2,630 | 4,470 |
| Flexural Modulus, p.s.i. | 141,760 | 375,300 |
| Dimensional Stability: | | |
| Humid Aging at 70° C. 24 hr. | N.C. | N.C. |
| Dry Heat Aging at 110° C. 24 hr. | N.C. | N.C. |
| Water Immersion: | | |
| 24 hr. at R.T. | N.C. | N.C. |
| 1 week at R.T. | N.C. | N.C. |
| Rockwell Hardness (M-scale) | 92.5 | 120 |

The greater strength of panel A/B produced from materials containing free hydroxyl groups as well as free isocyanate groups may be considered proof of the theory advanced above.

EXAMPLE 7

For the purpose of illustrating reproducibility of the present process, 3 panels were prepared from 30 parts (each panel) of the cellular rigid polyurethane particles prepared in Example 1, according to the procedure of Example 2 utilizing 3200 p.s.i., 155° C. and a compression period of about 20 minutes.

The resulting panels so prepared were compared and their physical properties are set forth in Table III.

Table III.—Physical properties of identically prepared panels

|         | Density (lb./ft.³) | Compression Load (p.s.i. at 10%) |
|---------|--------------------|----------------------------------|
| Panel 1 | 50.9               | 9,100                            |
| Panel 2 | 53.8               | 9,100                            |
| Panel 3 | 51.7               | 9,100                            |

The present invention may be embodied in other forms or carried out in other ways without departing from the spirit thereof. The present embodiment is, therefore, to be considered illustrative and not restrictive, the scope of the invention being indicated by the appended claims.

I claim:

1. A process for the production of non-cellular unitary structures which comprises reducing rigid polyurethane foam to particles having in their largest dimension a size of less than 3/8 inch and subjecting the resulting particles to pressure of at least about 2000 p.s.i. in combination with a temperature in the range of from about 25° to 260° C. for a period of at least 2 minutes.

2. A process for the production of non-cellular unitary structures which comprises reducing rigid polyurethane foam to particles having in their largest dimension a size of less than 1/8 inch and subjecting the resulting particles to pressure from about 2500 p.s.i. to about 5000 p.s.i. in combination with a temperature in the range of about 120° to 190° C. for a period of about 5 to about 60 minutes.

3. Non-cellular unitary structures prepared by reducing rigid polyurethane foam to particles having in their largest dimension a size of less than 3/8 inch and subjecting the resulting particles to pressure of at least about 2000 p.s.i. in combination with a temperature in the range of from about 25° to 260° C. for a period of at least 2 minutes.

References Cited by the Examiner

UNITED STATES PATENTS

| 2,847,711 | 8/1958  | Hibbard _____ 264—40    |
| 2,878,153 | 3/1959  | Hacklander _____ 264—248    |
| 2,890,514 | 6/1959  | Doran et al. _____ 264—112 X  |
| 2,994,110 | 8/1961  | Hardy _____ 264—112     |
| 3,004,293 | 10/1961 | Kreidl _____ 264—45 XR    |
| 3,026,574 | 3/1962  | Takacs et al. _____ 264—46  |
| 3,100,733 | 8/1963  | Bundy _____ 264—112 X    |

FOREIGN PATENTS 229,871   8/1960   Australia.

ALEXANDER H. BRODMERKEL, *Primary Examiner.*

MORRIS LIEBMAN, *Examiner.*

P. E. ANDERSON, *Assistant Examiner.*